United States Patent
Chan et al.

(10) Patent No.: US 8,069,012 B2
(45) Date of Patent: Nov. 29, 2011

(54) SAMPLING SUFFICIENCY TESTING

(75) Inventors: Benson Chan, Mooresville, NC (US);
Kenneth Ramaley, Fort Mill, SC (US);
Andrew Melton Bridgeman, Charlotte, NC (US)

(73) Assignee: Bank of America Corporation, Charlotte, NC (US)

(*) Notice: Subject to any disclaimer, the term of this patent is extended or adjusted under 35 U.S.C. 154(b) by 764 days.

(21) Appl. No.: 12/133,819

(22) Filed: Jun. 5, 2008

(65) Prior Publication Data

US 2009/0306933 A1 Dec. 10, 2009

(51) Int. Cl.
*G06F 17/18* (2006.01)
(52) U.S. Cl. .................................................. 702/181
(58) Field of Classification Search .................... 702/181
See application file for complete search history.

(56) References Cited

U.S. PATENT DOCUMENTS

2004/0210417 A1* 10/2004 Zakrzewski ................. 702/181

FOREIGN PATENT DOCUMENTS

WO 2008045554 4/2008

OTHER PUBLICATIONS

International Search Report, PCT/US2009/046396, maildate Jan. 4, 2010.

* cited by examiner

*Primary Examiner* — Tung S Lau
(74) *Attorney, Agent, or Firm* — Banner & Witcoff, Ltd.; Michael A. Springs

(57) ABSTRACT

Sampling sufficiency determinations are performed using probability calculations and statistical analysis during a testing process of a population of items. For example, an auditing or reviewing process may involve testing a predetermined sample set of items from the population in order to draw statistical conclusions about the passing or failing rate of the population as a whole. During an ongoing testing process, probability calculations and statistical analyses may be performed regarding the likelihood of the population to pass or fail according to an acceptable failure rate, based on the test results of a subset of the sample set. The sampling sufficiency analyses may potentially allow determinations that the testing process may be stopped before the complete testing of the sample set, and that the population may be declared a passing or failing population within a desired level of confidence.

16 Claims, 5 Drawing Sheets

SAMPLING SUFFICIENCY CALCULATOR

400

401 — Sample Size: [100]  Failures: [7] — 404
402 — Tolerable Error Rate: [.05]  Successes: [21] — 405
403 — Desired Confidence: [.97]  Total Observations: <u>*28*</u> — 406

407 — Minimum Number to Test for Credibility: [20]

408 — Recommendation: <u>Stop Testing</u>

409 — Explanation: <u>Sample Sufficient to Declare Failure</u>

410 — Level of Confidence of Failure: You are <u>99.7%</u> confident that the actual fail rate is greater than the tolerable error rate.

411 — Range for Desired Level of Confidence: You are 97% confident that the actual fail rate is at least <u>8.8%</u>.

FIG. 4

SAMPLING SUFFICIENCY TESTING

FIELD OF THE TECHNOLOGY

Aspects of the disclosure generally relate to testing a sample set of items and performing a statistical analysis during an auditing or review process of a large population.

BACKGROUND

Although large scale testing, review, and auditing processes often provide valuable business and organization data, these processes may take substantial amounts of time and consume valuable organization resources. For example, performing an auditing process on a large set of business documents may require employees to individually review, classify, score, and record the result for each separate document. A typical large scale review may include thousands or even millions of documents, each of which may be complex and time-consuming to review and classify. For instance, assume a business wanted to audit a set of service contracts to confirm that its quality control processes (e.g., automated tools, employee training, internal reviews, etc.) were working adequately to ensure that the contracts were being structured properly, used the correct language, and were being filled out correctly by employees and clients. However, while preparing for the audit, the business determined that 20,000 contracts were available for review, and each contract would take a human auditor approximately 1-2 hours to review. Thus, a comprehensive audit of its service contracts would cost the business approximately 30 years in employee work time. As another example, an internal customer service review may involve analyzing written transcripts of customer-agent telephone conversations to identify certain characteristics and criteria of the customer interactions. As in the previous example, if the organization attempted a comprehensive review of every transcript, the cost in employee time and other organization resources may be very large. As yet another example, an organization may want to review each of a large number of customer survey responses to find specific responses within the customer feedback. As these examples illustrate, comprehensive testing, auditing, and reviewing processes for large scale projects is often a costly proposition.

Sampling and statistical analysis provide businesses a way to perform testing processes on large amounts of data without having to test each item in the population. Sampling is a well known technique in the field of statistical analysis by which a sample set of individual items within the population are tested for the purpose of drawing statistical inferences about the population as a whole. Thus, by reviewing a relatively small number of items (e.g., contracts, transcripts, etc.) selected at random from the population, it may be possible to reach valid statistical conclusions about the overall population with a high degree of certainty. However, in many cases, the cost of reviewing even a small percentage of the overall population of items may be significant. In the above example of service contract auditing, if only 5% of the contracts were reviewed, the overall cost to the company would still exceed one year in employee work time. Furthermore, the precision of statistical inferences generally depend on the size of the sample sets reviewed. Thus, organizations that are compelled to select larger sample sets to increase their data precision will further increase their testing costs. Finally, although some sample sets do yield valid statistical inferences about the population as a whole, other sample sets might only yield inconclusive results and will therefore require additional testing before an adequate inference can be drawn.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

According to certain aspects of the present disclosure, sampling sufficiency calculations and statistical analyses may be performed as part of a testing process of a population of items. For example, an auditing or reviewing process may involve testing a predetermined sample set of items from the population in order to draw statistical inferences about a passing or failure rate of the overall population. In certain examples, probability calculations may be performed during the testing process corresponding to the likelihood of the population to pass or fail according to an acceptable failure rate, based on the test results of a subset of the sample set of items.

According to additional aspects of the present disclosure, one or more statistical analysis components (e.g., software functions, applications, specialized computing devices) may receive parameter values corresponding to a sample size, an acceptable failure rate and required levels of confidence, and test result data for a subset of the sample set of the population. The statistical analysis components may calculate probabilities that the failure rate for the population is within the acceptable failure rate based on the received parameter values and subset test results. The probabilities may also be compared to required confidence levels to determine whether or not the testing process may be stopped and the population may be declared a passing or failing population within the required confidence levels. According to further aspects of the present disclosure, the number of received test results may be compared to a credibility threshold value and/or to the overall number of items in the sample set, to further determine whether additional testing will be recommended.

According to additional aspects of the present disclosure, probability calculations for the population may use any one, or a combination, of different statistical techniques including binomial theorem and/or normal approximation to calculate one or more probabilities that the population is within, or is not within, an acceptable failure rate. For example, when using the normal approximation method, the analysis may include calculating an observed failure rate, the standard deviation of the failure rate, and a z-score based on the current failure rate. In this example, the z-score for the current failure rate may be compared to one or more different z-score values associated with a required level of confidence regarding the adequacy of the population to determine whether additional testing will be recommended.

BRIEF DESCRIPTION OF THE DRAWINGS

Figure 1:
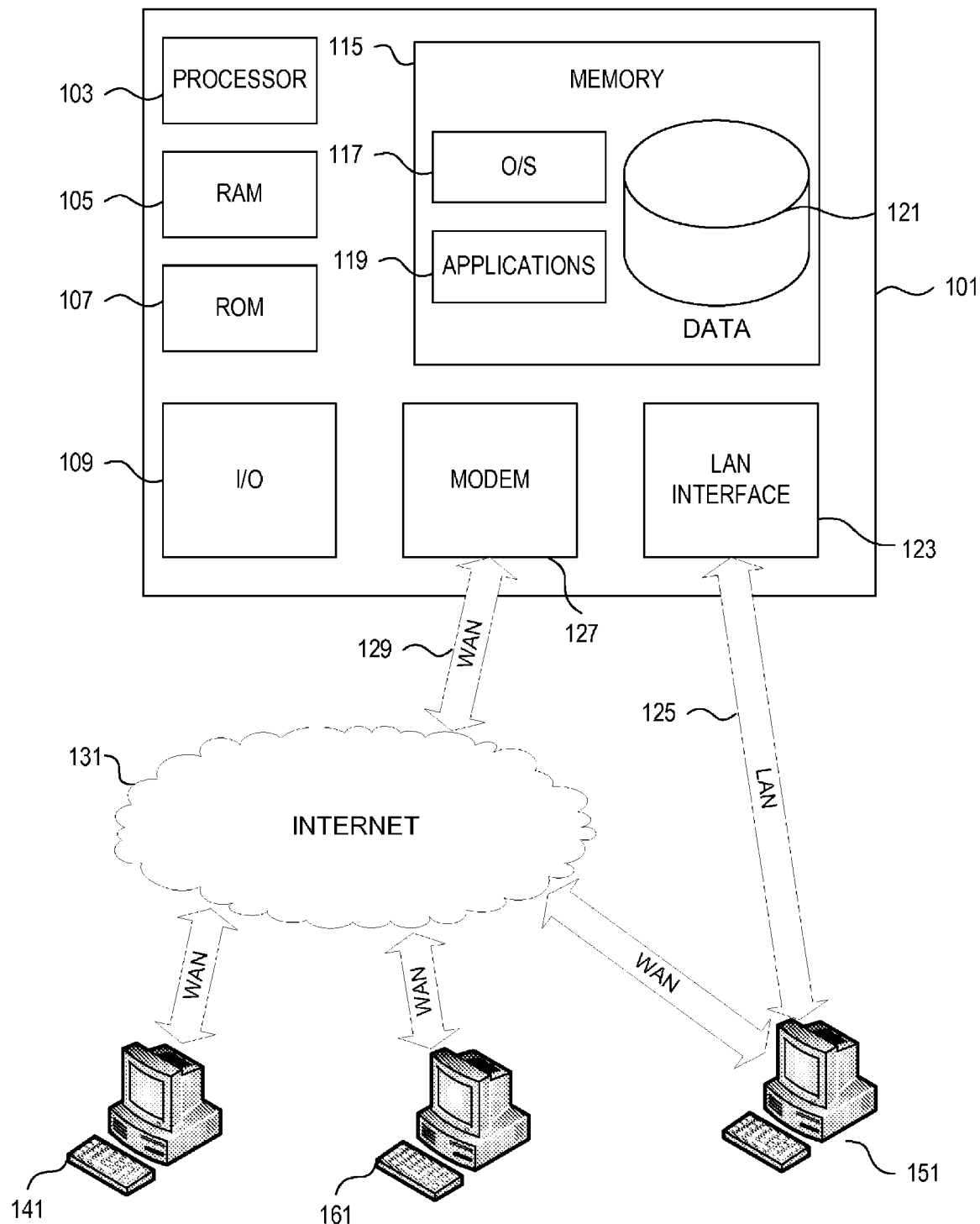
Figure 2:
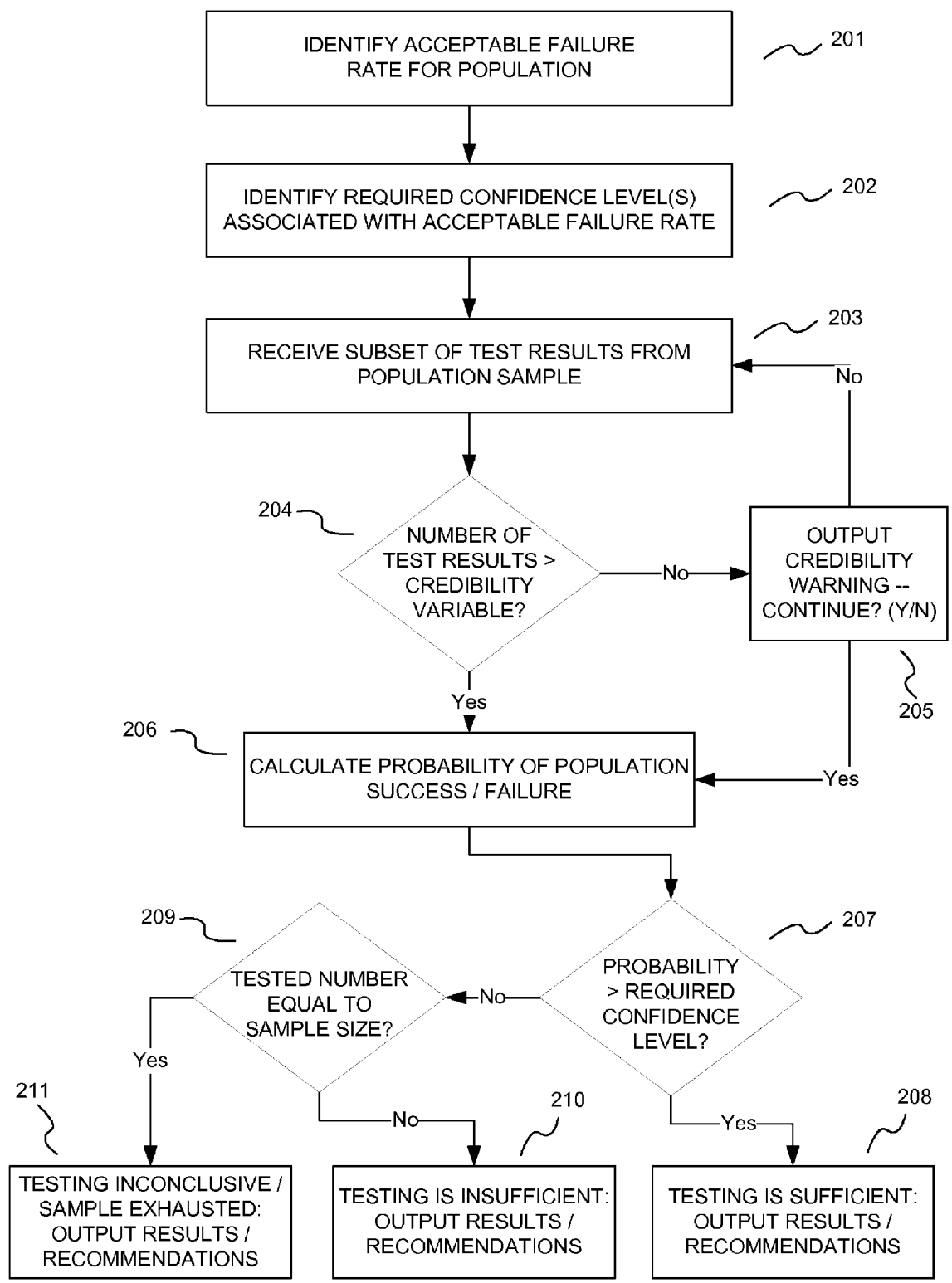
Figure 3:
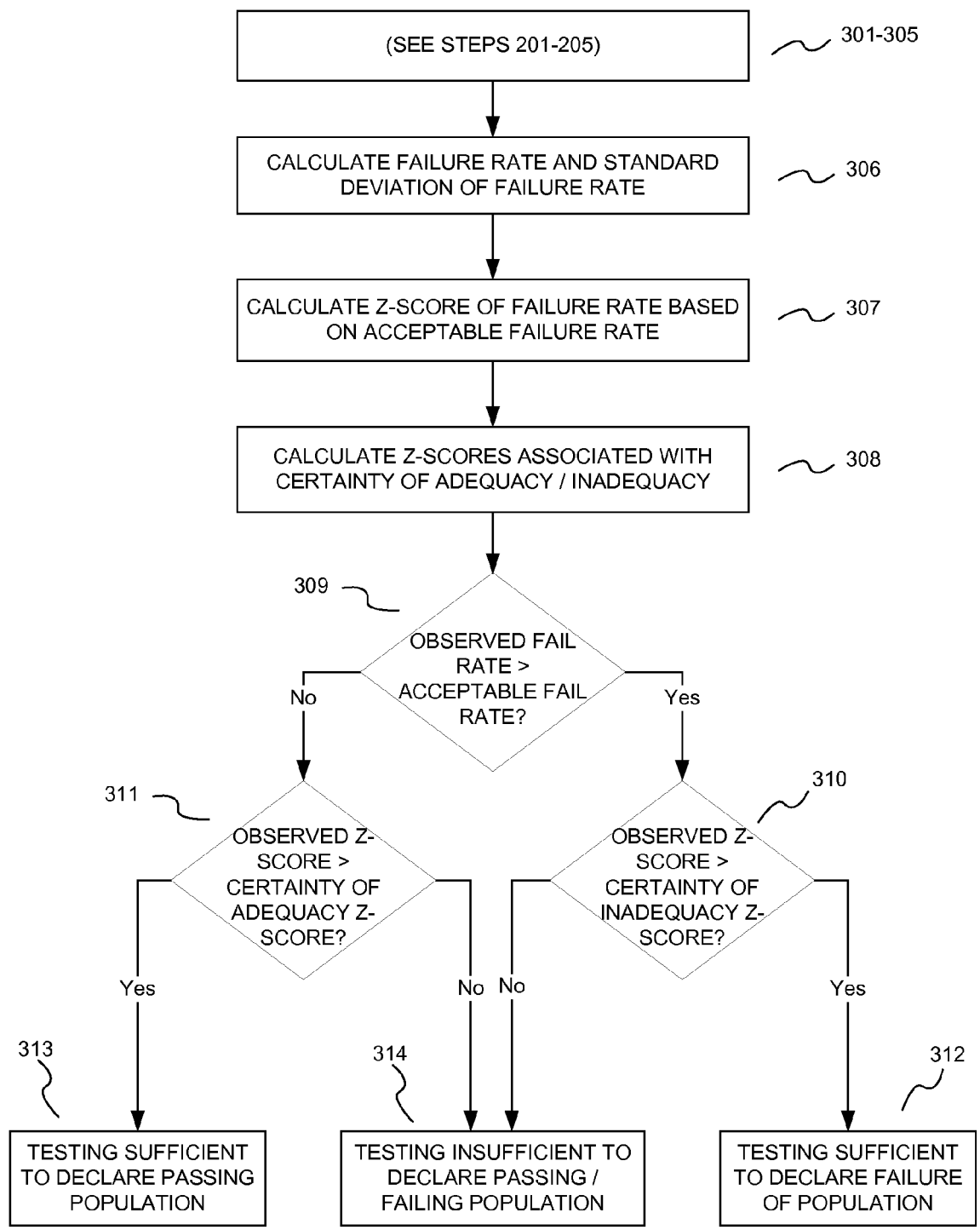
Figure 5:
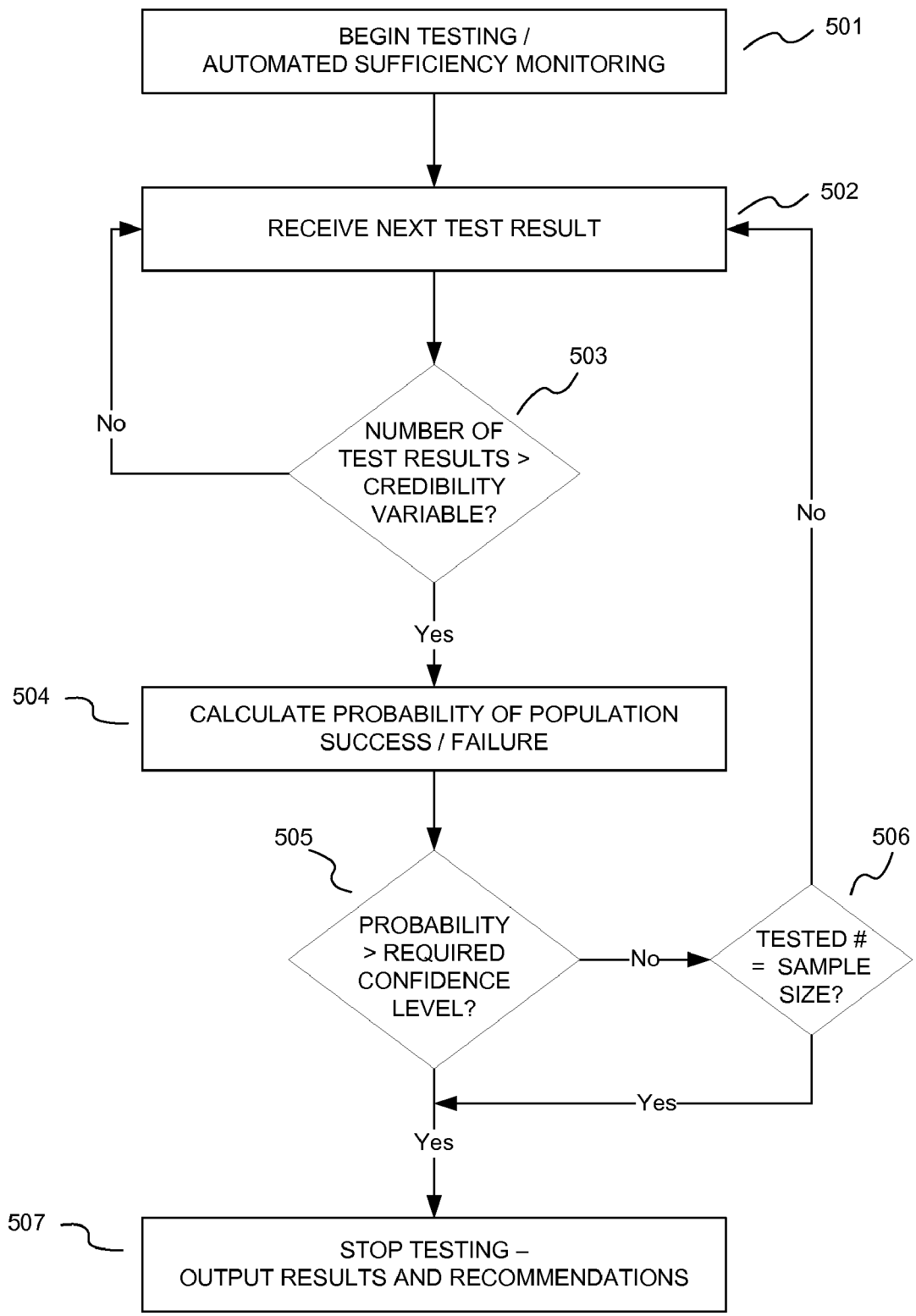

Having thus described the invention in general terms, reference will now be made to the accompanying drawings, which are not necessarily drawn to scale, and wherein:

FIG. 1 is a block diagram illustrating a computing device and network, in accordance with illustrative aspects of the present invention;

FIG. 2 is a flow diagram showing illustrative steps for determining the sufficiency of a testing of a population, in accordance with illustrative aspects of the present invention;

FIG. 3 is a flow diagram showing illustrative steps for determining the sufficiency of a testing of a population, in accordance with illustrative aspects of the present invention;

FIG. 4 is an illustrative user interface for determining the sufficiency of a testing of a population, in accordance with illustrative aspects of the present invention; and FIG. 5 is a flow diagram showing illustrative steps for monitoring a testing of a population to determine the sufficiency of the testing, in accordance with illustrative aspects of the present invention.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope and spirit of the present invention.

As will be appreciated by one of skill in the art upon reading the following disclosure, various aspects described herein may be embodied as a method, an apparatus, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein, referred to as computer readable transmission media, may be transferred between a source and a destination in the form of electromagnetic waves traveling through signal-conducting media such as metal wires, optical fibers, and/or wireless transmission media (e.g., air and/or space).

FIG. 1 illustrates a block diagram of a generic computing device 101 (e.g., a client desktop or laptop computer, a mobile device, a computer server such as a web server, a data store providing services, etc.) that may be used according to an illustrative embodiment of the invention. The computer 101 may have a processor 103 for controlling overall operation of the server and its associated components, including RAM 105, ROM 107, input/output module 109, and memory 115.

I/O 109 may include a microphone, keypad, touch screen, mouse, and/or stylus through which a user of the computer 101 may provide input, and may also include one or more of a speaker for providing audio output and a video display device for providing textual, audiovisual and/or graphical output. Other I/O devices may also be used. Software may be stored within memory 115 and/or external storage to provide instructions to processor 103 for enabling computer 101 to perform various functions. For example, memory 115 may store software used by the computer 101, such as an operating system 117, application programs 119, and an associated database 121. Alternatively, some or all of the computer executable instructions in computer 101 may be embodied in hardware or firmware (not shown).

The computing device 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are exemplary and other means of establishing a communications link between the computers may be used. The existence of any of various well known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, an application program 119 used by the computer 101 according to an illustrative embodiment of the invention may include computer executable instructions for invoking user functionality related to communication, such as email, short message service (SMS), and voice input and speech recognition applications.

Referring to FIG. 2, a flow diagram is shown including illustrative steps for performing calculations to determine the sufficiency of a testing of a population. As described below, the steps in this example may be performed by a computing device 101 comprising a sampling sufficiency calculator or test process monitoring tool. For instance, a software application 119 configured to perform steps to calculate testing sufficiency may be stored and executed on the computer 101, for example, as a standalone application, web-based application, or one or more library functions that may be invoked by and integrated into other software components. In other examples, similar steps to calculate probabilities and determine testing sufficiency of a test may be performed manually, or may be implemented in hardware within a specialized computing device 101.

The steps 201-211 of FIG. 2, described below, relate to testing a sample set of items from a larger population as part of an ongoing testing process. An auditing process, for example, may involve reviewing a sample set of items (i.e., predetermined sized subset of the items in the population) and using statistical formulas to draw inferences/conclusions about the overall population of items based on the sample set. Using the example described above, an organization may decide to audit its previous service contacts to confirm that its quality control processes (e.g., automated tools, employee training, internal reviews, etc.) are working adequately to ensure that the contracts are structured properly, use the correct language, and have been filled out correctly by employees and clients. In this example, if 20,000 previous contracts were applicable to the audit, then the organization might select a random sample set of 500 contracts for reviewing to attempt to draw statistical inferences about the compliance rate (i.e., pass/fail rate) for the overall population of contracts within a predetermined level of confidence. The sample size may be chosen using well known techniques of statistical analysis to achieve a desired precision of measurement.

As described below, the calculations in these examples may be performed during an ongoing testing of a sample set, and may potentially allow users to determine that the entire sample set need not be tested and that valid statistical inferences can be drawn regarding the failure rate of the population using only a subset (e.g., a randomly selected subset) of predetermined sample set. For example, a sample set may comprise a random subset of a population of items, where each item is capable of being tested to determine whether the item is a passing or failing item. In these examples, as described below, the statistical inferences may relate to the probability that the overall pass/fail rate of the population as a whole is above, below, or within an acceptable range. In other examples, the sample set may comprise items that can each be tested and scored (e.g., 1-100) or graded (e.g., A+ to F), etc., according to an item rating system. In these examples, the statistical inferences may relate to a projected percentage of items in the population have a score or grade value above or below a predetermined value, or within a predetermined range of values (e.g., a statistical conclusion that at least 90% of the items have a score of 75 or higher). In other examples, the statistical inferences may correspond to probabilities that certain percentages of the items in the population are above, below, or within certain ranges of values (e.g., a calculated 95% probability that at least 10% of the items are D-grade or lower according to the item rating system). In potentially any of the above examples, and other examples discussed herein, since testing the items in the population may be costly and time consuming, a determination that the entire sample set need not be tested may potentially save considerable time and effort during the testing process As mentioned above, a sample set may be a randomly selected and/or randomly ordered subset taken from the overall population of items. In these examples, the subset of the sample set might not need to be selected using a random selection technique, because the sample set itself is already fully randomized. Thus, the subset of the sample set might simply be chosen sequentially starting at the beginning of the random sample set. However, in other examples, a sample set of a population might not be randomly selected, or might be randomly selected but not randomly ordered. In these examples, the subset may be selected from the sample set in a random manner, in order to assure that the tested subset is in fact a random set with respect to the sample set and/or the population as a whole. To illustrate, an organization may identify a sample set of customer call transcripts for testing using random selection processes from call centers in three different cities, but then store the combined set of transcripts on a testing server in order by city. In this example, it may be advantageous to randomize the sample set of transcripts before the subset is chosen, or to select the subset of the sample set using a random selection technique, in order to avoid a possible statistical bias by selecting and testing a subset of transcripts that are all from the same city.

In step 201, the acceptable failure rate (or tolerable fail rate) is identified for a population of items undergoing a testing process. For example, prior to a contract auditing process, an organization may have put quality controls in place (e.g., automated tools, employee training, review processes, etc.) to ensure that the contract is structured and filled out correctly. During the audit, the organization may then set an acceptable fail rate of 0.05, meaning that if more than 5% of the contracts are defective or incorrectly filled out (i.e., failing), then the controls currently in place are insufficient and the organization may follow up with additional layers of controls to achieve a higher contract passing rate in the future. Thus, during the sampling sufficiency analysis performed in FIG. 2, the acceptable failure rate identified in step 201 is typically provided by a user or test administrator based on the policies and goals of the organization with respect to the current testing process. It is understood that certain testing, auditing, and reviewing processes will have higher acceptable failure rates than others.

In step 202, one or more confidence levels are identified that correspond to the acceptable failure rate received in step 201. The confidence level(s) received in this example correspond to a desired (or required) level of certainty that must be achieved before the sampling sufficiency analysis will determine that the testing of the sample set can be stopped and the population can be declared either passing or failing. Thus, using the contract audit example discussed above, the user may set the required confidence level at 0.95, meaning that the sufficiency analysis should not prematurely stop testing a sample set until there is a 95% certainty that less than 5% of the contracts in the population will fail (or, in other examples, when there is a 95% certainty that more than 5% of the contracts in the population will fail).

In other examples, the sampling sufficiency analysis may accept two separate confidence levels, a required level of confidence to stop the testing and declare the population as passing, and a required level of confidence to stop the testing and declare the population as failing. For example, the user may set the required confidence level for passing at 0.95, and the required confidence level for failing at 0.98, meaning that the sampling sufficiency analysis should stop the testing only when it is 95% certain that the failure rate for the overall population of contracts is within the acceptable failure rate, or when it is 98% statistically certain that the failure rate for the overall population of contracts exceeds the acceptable failure rate.

In step 203, the sampling sufficiency analysis receives a subset (e.g., a randomly selected subset) of test results from the sample set. For example, if the predetermined sample set consists of 300 contracts, then the subset of test results might represent the first 50 randomly selected contracts for which testing has been performed. As described below in reference to FIG. 4, these test results may be entered manually by a user into a sampling sufficiency user interface 400 as a failures value 404 and a successes value 405, which may be summed to determine the overall number of observations thus far 406. Additionally, as described in reference to FIG. 5, test results may be entered automatically as part of the testing, reviewing, or auditing process. For example, the sampling sufficiency analysis of FIG. 2 may be implemented as a software library function integrated into a computerized review process. In this example, a user may enter on the computer during the review process whether each item is a passing or failing item, after which the sampling sufficiency function may automatically update the observed/failing/passing item counts for the next set of probability calculations. In other examples, a software component may automatically identify passing and failing items, and automatically update these values within the sampling sufficiency system without requiring any user action. Thus, certain fully automated testing, reviewing, and auditing processes may be capable of testing the items in the sample set, updating the observed/failed/passed counts, and initiating the sampling sufficiency calculations and analysis described below without any manual user input.

In step 204, the number of test results received is compared to a predetermined credibility threshold. For example, the user may define a credibility threshold of 30 contracts, meaning that regardless of any potential probability calculation or valid statistical conclusion about the passing/failing of the sample set, the testing will not be stopped until test results from at least 30 contracts have been received. In other words, even if the probability calculations for the first 29 contracts would indicate with overwhelming certainty that the population will exceed the acceptable failure rate, the testing process will not be stopped until the credibility threshold has also been reached. Thus, the credibility threshold is this example is not based on any statistical theory, but rather exists to provide a measure of business legitimacy and user piece of mind before stopping the testing of a sample set and declaring the population passing or failing.

If the credibility threshold has not been met (204:No), then the sampling sufficiency system may output a credibility warning in step 205, informing the user that the credibility threshold has not yet been met, and asking whether or not the user wishes to continue with the probability calculations in spite of the credibility threshold. In step 205, if the user elects to continue with the probability calculations (205:Yes), then the sampling sufficiency analysis of steps 206-211 may continue. Instead, if the user elects to wait until the credibility threshold is reached (205:No), then the sampling sufficiency process will require additional test results before performing the probability calculation of step 206.

As noted above, the credibility variable is this example is not based on any statistical theory, but exists for largely psychological reasons. Accordingly, steps 204 and 205 are optional and may be eliminated in certain examples. Additionally, in automated implementations of the sampling sufficiency analysis, the credibility threshold may be enforced automatically without requiring any user input. Thus, step 204 may be retained while eliminating step 205 and automatically enforcing the credibility threshold without confirmation from the user.

In step 206, based on the observed test results from the subset of the sample population, a probability is calculated corresponding to the probability that the failure rate for the overall population will fall within the acceptable failure rate identified in step 201. In this example, the probability calculation of step 206 may correspond to Equation 1, defined below:

$$P(\text{Observation} | \text{AcceptableFailureRate}) = \frac{n!}{s!f!} p^f (1-p)^s \quad \text{Equation 1}$$

p=Acceptable failure rate
n=Number of observations
s=Number of successes
f=Number of failures
P(Observations|AcceptableFailureRate)=Probability that the observed ratio of failures to successes would have been observed if the true population failure rate is equal to the acceptable failure rate In step 207, the probability calculated in step 206 is compared to the required confidence level received in step 202. For example, if the user-defined level of confidence required to stop testing and declare that the failure rate for the population is within the acceptable failure rate is 0.95 (95%), and the P(Observations|AcceptableFailureRate) probability value calculated is 0.98 (98%), then in step 208 the sample set testing may be stopped and a valid statistical conclusion may be output to inform the user that the population has passed with an adequate level of certainty. Similarly, if the level of confidence required to stop testing and declare that the failure rate for the population exceeds the acceptable failure rate is 98%, and several early observed failures have resulted in a P(Observations|AcceptableFailureRate) probability value of 0.012 (1.2%), then in step 208 the sample set testing may be stopped and a valid statistical conclusion may be output to inform the user that the population has failed with an adequate level of certainty.

As discussed above, there may be two separate confidence levels, a required level of confidence to stop the testing and declare the population as passing, and a required level of confidence to stop the testing and declare the population as failing. Thus, if the two values are different, then the required confidence level used in the comparison of step 207 may depend on whether the observed failure rate is greater than the acceptable failure rate. If $$\frac{f}{n} > p,$$

then the observed failure rate is greater than the acceptable failure rate, and the calculated probability value should be compared to the required level of confidence to stop the testing and declare the population as failing. Alternatively, if $$\frac{f}{n} < p,$$

then the observed failure rate is less than the acceptable failure rate, and the calculated probability value should be compared to the required level of confidence to stop the testing and declare the population as passing.

In this example, if the probability calculated in step 206 is greater than the required confidence level (207:Yes), then the testing is sufficient and no more of the sample set needs to be tested. Thus, in step 208, testing may be stopped and the user may be informed that the population has passed (or failed) with an adequate level of certainty. However, if the probability calculated in step 206 is less than the required confidence level (207:No), then the subset of tested items were insufficient to determine whether or not the population is passing (or failing) to an adequate level of certainty.

Thus, the statistical conclusion at step 209 is that additional testing is required in order to determine to an adequate level of certainty (i.e., the desired/required level of confidence) whether or not the failure rate of the population is within the acceptable failure rate. In step 209, the number of test results received is compared to sample size to determine if there are additional items in the sample size that are available for testing. If so (209:No), then in step 210 the user is informed that the tested subset of the population sample is insufficient to draw an adequate statistical conclusion about whether or not the population passes or fails. Thus, in step 210, the user may receive a recommendation to continue testing additional items from the sample set. In other examples, such as in automated implementations of a sampling sufficiency system, step 210 may be eliminated and the process may return directly (i.e., without any user intervention) to step 203 to receive additional test results and perform additional probability calculations and analyses.

In step 209, if every item in the sample set has been tested, and the results of the tested sample set are still insufficient to draw an adequate statistical conclusion regarding whether or not the failure rate for the population is within the acceptable failure rate (209:Yes), then in step 211 the user is informed that the testing of the sample set is complete but that the test is inconclusive. Thus, in step 211, the user may also receive a recommendation to collect an additional sample set for further testing.

Referring to FIG. 3, another flow diagram is shown including another set of illustrative steps for determining the sufficiency of a testing process. The steps described in this example may receive similar inputs and provide similar outputs and recommendations to the user regarding the sufficiency of the testing process as steps 201-211 of FIG. 2. However, in the example shown in FIG. 3, the sampling sufficiency process uses a normal approximation to calculate the probability that the population is within the acceptable failure rate, whereas the example of FIG. 2 uses binomial theorem to calculate this corresponding probability. As is well known within the field of statistical analysis, the normal approximation method provides greater precision when used with a larger number of observations. Thus, in certain implementations, it may be possible to integrate the binomial theorem process of FIG. 2 and the normal approximation process of FIG. 3 into a single sampling sufficiency system. For example, a sampling sufficiency system may use the binomial theorem process of FIG. 2 when the number of observations is less than a predetermined amount (e.g., 30 observations), and then use normal approximation process of FIG. 3 when the number of observations is greater than or equal to that amount.

As indicated in FIG. 3, steps 301-305 may be identical to steps 201-205 of FIG. 2. Thus, like the binomial theorem process of FIG. 2, the sampling sufficiency technique in FIG. 3 may initially identify an acceptable failure rate, required confidence level(s), an optional credibility variable, and then may receive the test results from a subset (e.g., a randomly selected subset) of the population sample.

Continuing on to steps 306-308, rather than calculating probability using the binomial theorem and Equation 1 (see step 206), in this example the probability is calculated using normal approximation by first calculating the observed failure rate and the standard deviation and z-score of the observed failure rate. Thus, in step 306, the failure rate of the observed test results may be calculated using Equation 2, defined below:

$$ObservedFailureRate = \frac{f}{n} \qquad \text{Equation 2}$$

n=Number of observations
f=Number of failures

Also in step 306, the standard deviation of error of the observed failure rate may be calculated using Equation 3, defined below:

$$StdDeviationofError = \sqrt{\frac{\left(\frac{f}{n}\right)*\left(1-\frac{f}{n}\right)}{n}} \qquad \text{Equation 3}$$

n=Number of observations
f=Number of failures

In step 307, the z-score of the observed failure rate may be calculated. A z-score is a well known value in statistical analyses corresponding to the number of standard deviations that an observation is above or below the mean. In this example, the z-score for the observed failure rate is calculated based on the assumption that the acceptable failure rate (p) is the actual (mean) failure rate. Accordingly, the z-score for the observed failure rate is calculated using Equation 4, defined below.

$$\text{Observed } z\text{-score} = \frac{\frac{f}{n} - p}{\sqrt{\frac{\left(\frac{f}{n}\right)*\left(1-\frac{f}{n}\right)}{n}}} \qquad \text{Equation 4}$$

p=Acceptable failure rate
n=Number of observations
f=Number of failures

In step 308, one or more additional z-scores are calculated corresponding to the level of confidence required to stop testing and declare that the failure rate of the population exceeds the acceptable failure rate and/or the level of confidence required to stop testing and declare that the failure rate of the population is within the acceptable failure rate. These z-scores associated with the certainty of adequacy/inadequacy of the sample set may be calculated using Equations 5 and 6, defined below:

$$Z\text{-score for certainty of adequacy } Z_A = \qquad \text{Equation 5}$$
$$H \text{ when } A = \frac{1}{\sqrt{2\pi}} \int_{-\infty}^{H} e^{\frac{-u^2}{2}} du$$

A=Required level of confidence in order to stop testing and declare that the failure rate of the population is less than the acceptable failure rate
H=Z-score for certainty of adequacy of the tested subset $$Z\text{-score for certainty of inadequacy } Z_{NA} = \qquad \text{Equation 6}$$
$$H \text{ when } NA = \frac{1}{\sqrt{2\pi}} \int_{-\infty}^{H} e^{\frac{-u^2}{2}} du$$

NA=Required level of confidence in order to stop testing and declare that the failure rate of the population exceeds the acceptable failure rate
H=Z-score for certainty of inadequacy of the tested subset In certain automated implementations, generation of the z-score values may be assisted by statistical analysis tools so that the manual entry and/or calculation of Equations 5 and 6 might not be necessary. For example, in the Microsoft EXCEL® spreadsheet application, the z-scores associated with certainty of adequacy and inadequacy can be computed using the EXCEL® formulas NORMSINV(A) and NORMSINV(NA), where NORMSINV (p) returns the z value such that, with probability p, a standard normal random variable takes on a value that is less than or equal to z.

Upon reaching step 309, the subset (e.g., a randomly selected subset) of test results has been received and the relevant probabilities have been calculated for determining the sufficiency of the population based on the tested subset. In step 309, the observed fail rate (Equation 2) is compared to the acceptable fail rate. If the observed fail rate is greater than the acceptable fail rate (309:Yes), then the next relevant determination relates to the level of confidence required to declare that the population exceeds the acceptable failure rate. That is, if the number of observed failures is greater than expected, then the level of confidence in declaring the population as passing is irrelevant because the probability of the population passing will always be less than 0.5, and always be less than the probability of the population failing.

Accordingly, if the number of observed failures is greater than expected based on the acceptable failure rate (309:Yes), then in step 310 the z-score for the observed failure rate (Equation 4) is compared to the z-score for certainty of inadequacy of the sample set (Equation 6). If the observed z-score is the larger of the two z-scores (310:Yes), then the observed test results are sufficient to declare (with an acceptable level of confidence NA) that the failure rate of the population exceeds the acceptable failure rate. Another way of expressing this conclusion is that the statistical analysis has determined with a NORMSDIST (Observed z-score) level of confidence that the failure rate of the population is greater than the acceptable failure rate, where NORMSDIST(z) returns the probability that the observed value of a standard normal random variable will be less than or equal to z. The NORMSDIST function is also available in Microsoft EXCEL® and other statistical analysis or spreadsheet applications. This function is the inverse of the NORMSINV function described above. Thus, in step 312, the testing may be stopped, either automatically or by notifying the user that, with an adequate level of certainty NA, the tested subset is sufficient and the population has failed.

Alternatively, if the z-score for certainty of inadequacy of the sample set (Equation 6) is greater than the observed z-score (310:No), then although the tested subset has a greater than expected number of failures, there are not yet enough failures to conclude that the population is failing with the desired level of confidence NA. Accordingly, in step 314, the user may be informed that the tested subset of the population sample is insufficient to draw an adequate statistical conclusion about whether or not the population will pass or fail, and a recommendation may be provided to continue testing additional items from the sample set.

Returning to step 309, if the number of observed failures is less than expected based on the acceptable failure rate (309: No), then in step 311 the z-score for the observed failure rate (Equation 4) is compared to the z-score for certainty of adequacy of the sample set (Equation 5). If the observed z-score is the larger of the two z-scores (311:Yes), then the observed test results are sufficient to declare (with an acceptable level of confidence A) that the failure rate of the population is within the acceptable failure rate. Thus, in step 313, the testing may be stopped, either automatically or by notifying the user that, with an adequate level of certainty A, the tested subset is sufficient and the population has passed.

Similarly, if the z-score for certainty of adequacy of the sample set (Equation 5) is greater than the observed z-score (311:No), then although the tested subset has a lesser than expected number of failures, there are not yet enough observations to conclude that the population is passing with the desired level of confidence A. Therefore, in step 314, the user may be informed that the tested subset of the population sample is insufficient to draw an adequate statistical conclusion about whether or not the population will pass or fail, and a recommendation may be provided to continue testing additional items from the sample set.

As discussed above in reference to step 209, step 314 may also include a determination of whether or not all items within the sample set have been tested. If so, the user may be informed in step 314 that the testing of the sample set is complete but that the test is still inconclusive, and a recommendation may be provided to collect an additional sample set for further testing.

Referring to FIG. 4, an illustrative screenshot of a user interface 400 is shown for a sampling sufficiency calculator to determine the sufficiency of a testing of a population. The user interface 400 shown in this example may be part of a standalone or web-based software application that allows users to manually perform a sampling sufficiency analysis during an ongoing testing, review, or auditing process. The input values 401-407 in this example correspond to the same inputs used for the sampling sufficiency processes described above in FIGS. 2 and 3. However, in this example and other implementations in which the sampling sufficiency software component accepts input values from an external source (e.g., library function, API, etc.), it may be possible to restrict the computer data types and range of values that will be accepted for each parameter. For instance, the input parameters to the user interface 400 may be described and limited as follows:

Sample Size (401)—Number of items in the sample population set. Positive integer.

Tolerable Error Rate (402)—Acceptable failure rate for the population. Real number between 0 and 1.

Desired Confidence (403)—The required level of certainty that the population passes or fails before the analysis will conclude that the testing is sufficient. Real number between 0.5 and 1. As discussed above, in other examples, there may be two different desired confidence values, one corresponding to a level of certainty that is needed to stop the testing and declare that the population passes, and the other corresponding to a level of certainty that is needed to stop the testing and declare that the population fails.

Failures (404)—Number of failing items tested. Integer greater than or equal to 0.

Successes (405)—Number of passing items tested. Integer greater than or equal to 0.

Total Observations (406)—Number of items tested. Integer greater than 0 and less than or equal to the sample size 401. This number may be computed automatically by the sampling sufficiency calculator by summing the failures 404 and successes 405.

Minimum Number to Test for Credibility (407)—User defined credibility variable. Optional integer greater than 0 and less than or equal to the sample size 401.

In this example, after a valid set of values has been entered via the user interface 400, the statistical analysis and corresponding probability calculations are performed and the recommendations and output data 408-411 are displayed on the user interface 400. Thus, the software underlying the user interface 400 may perform a statistical analysis similar to that described in FIG. 2 and/or FIG. 3 above For instance, when the number of total observations 406 is less than a predetermined number (e.g., 50 observations), then the binomial theorem process of FIG. 2 may be used and the software may perform steps 201-211, and when the number of observations is greater than or equal to the predetermined number, the normal approximation process of FIG. 3 may be used and the software may perform steps 301-314.

In the user interface 400 of FIG. 4, the recommendations and output data 408-411 may be calculated and displayed automatically whenever the data in any of the input fields 401-407 is updated. In other examples, the user interface 400 may provide a submit button to allow the user to initiate the generation of recommendations and output.

After a statistical analysis has been completed, the recommendation field 408 may be filled with a simple text message such as, 'Continue Testing' when there are not yet enough test results to conclude that the population is passing or failing with the desired level of confidence, or 'Stop Testing' when the test results are sufficient to determine that the population is passing or failing with the desired level of confidence. Explanation field 409 may provide more detailed information regarding the recommendation, such as, 'Sample Sufficient to Declare Failure,' 'Sample Sufficient to Declare Success,' or 'Sample Fully Tested.'

The level of confidence data field 410 displays the calculated probability that the population passes or fails based on the tolerable error rate 402 entered by the user. In the example shown, the statistical analysis has determined that there is 99.7% probability that the population exceeds the tolerable error rate of 0.05 provided. Since this probability exceeds the user's desired confidence level of 97% (403), the sampling sufficiency analysis has concluded that the testing process can be stopped. However, if the level of confidence in field 410 were less than the user's desired confidence level 403, the recommendation 408 would change to 'Continue Testing.'

The range for the desired level of confidence 411 displays a range of possible failure rates that can be predicted based on the sampling sufficiency analysis to the user's selected level of confidence 403. In this example, field 411 indicates that there is a 97% probability that the failure rate for the population is greater than 8.8%. This confirms the conclusion that the testing process can be stopped, since the user's tolerable error rate 402 is 5%, and the sampling sufficiency analysis has determined with 97% probability that population's failure rate is greater than 8.8%. In certain examples, the range field 411 will provide a range of failure rates expressed as an 'at least' or 'less than' range, while in the other examples the range of failure rates may be between two discrete values (e.g., 'You are 99% confident that the actual fail rate is between 3% and 17%'). In this example, the range of possible failure rates may be defined as the range from a first value of [ObservedFailureRate−X*StdDeviationofError] to a second value of [ObservedFailureRate+X*StdDeviationofError] where X is calculated as the NORMSINV associated with the desired level of confidence 403 (see Equations 5 and 6 above).

Referring to FIG. 5, a flow diagram is shown illustrating process steps for monitoring a testing of a population to determine the sufficiency of the testing. As described below in reference to FIG. 4, test results may be manually entered by a user into a sampling sufficiency user interface 400, or may be provided as input parameters to a sampling sufficiency software function. However, in other examples, the test results and parameters for the sampling sufficiency analysis may be entered automatically as part of the testing, reviewing, or auditing process, as shown in FIG. 5. In this example, rather than waiting for a user to provide updated result data and/or parameters before performing the probability calculations and analysis, the software component may be configured to automatically receive (e.g., request or generate) additional test results and continuously execute the probability calculations and sampling sufficiency analyses to determine the earliest possible time that the testing can be stopped.

In this example, the parameters for the sampling sufficiency analysis are defined and the monitored testing begins at step 501. At step 502, an additional test result is received, for example, based on a user action or an automated determination that a new item in the sample set has been identified as a passing or failing item. Upon receiving the additional test result(s) in step 502, the analysis of steps 503-507 may be initiated automatically. Thus, if the number of observations is greater than the credibility threshold value (503:Yes), as described above in step 204, then probability of success or failure of the population is calculated and compared to the required confidence level in steps 504 and 505. After a passing/failing determination is possible with the required confidence level (505:Yes), or when the entire sample set has been tested (506:Yes), the testing process may be automatically stopped and the appropriate set of recommendations and output data may be provided to the user in step 507. In certain examples, the output data and/or recommendations may be provided via automated communication systems, such as a warning message sent to a user's pager, an email or short message service (SMS) message, or other notification systems. Thus, as shown in this example, certain testing processes may be automatically monitored by a software component capable of updating the observed/failed/passed counts in real time, initiating a sampling sufficiency analysis, providing recommendations and output data, and/or actually stopping and continuing the testing without any instructions or additional input from the user.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or sub-combination with elements of the other embodiments. It will also be appreciated and understood that modifications may be made without departing from the true spirit and scope of the present invention. The description is thus to be regarded as illustrative instead of restrictive on the present invention.

The invention claimed is:

1. A computing device comprising:
    a processor controlling at least some operations of the computing device; and
    a memory storing computer executable instructions that, when executed by the processor, cause the device to perform a method to calculate the sufficiency of a testing of a population comprising a predetermined number of items, said method comprising:
        identifying an acceptable failure rate for the population, wherein each item in the population is capable of being tested to determine whether the item is a passing item or a failing item based on a set of testing parameters;
        receiving a required confidence level corresponding to at least one of (a) a desired probability that the failure rate for the population is within the identified acceptable failure rate, or (b) a desired probability that the failure rate for the population is not within the identified acceptable failure rate;
        identifying a sample set of items in the population, wherein a size of the sample set is based on a desired testing precision;
        before the entire sample set of items is tested, receiving test results for a subset of the items in the sample set;
        based on the test results for the subset of items, calculating a probability that the failure rate for the population is within the identified acceptable failure rate;
        comparing the required confidence level to the calculated probability that the failure rate for the population is within the identified acceptable failure rate;
        based on said comparison, determining whether to test additional items in the sample set not included in the subset of items; and
        after the required confidence level has been exceeded, calculating and outputting data corresponding to a probability that, based on the received test results, the failure rate for the population is within the identified acceptable failure rate.

2. The computing device of claim 1, wherein the calculated data is one of:

the probability that the failure rate for the population is within the identified acceptable failure rate; or the probability that the failure rate for the population is not within the identified acceptable failure rate.

3. The computing device of claim 1, wherein receiving the required confidence level comprises:

receiving a first required confidence level corresponding to a desired probability that the failure rate for the population is within the identified acceptable failure rate; and receiving a second required confidence level different from the first required confidence level, the second required confidence level corresponding to a desired probability that the failure rate for the population is not within the identified acceptable failure rate.

4. The computing device of claim 1, the method further comprising:

determining that not every item in the sample set has been tested; and determining that no additional items need to be tested in order to achieve the required confidence level that either the failure rate for the population is within the acceptable failure rate, or that the failure rate for the population is not within the acceptable failure rate.

5. The computing device of claim 1, wherein the method further comprises:

determining that every item in the sample set has been tested;

determining that additional items need to be tested in order to achieve the required confidence level that either the failure rate for the population is within the acceptable failure rate, or that the failure rate for the population is not within the acceptable failure rate; and outputting an indication that the entire sample set has been tested and the required confidence level has not yet been achieved.

6. The computing device of claim 1, the method further comprising receiving a credibility threshold value;

comparing the credibility threshold value to the number of items for which test results have been received;

performing a determination of whether or not to test additional items in the sample set based on the comparison, wherein if the number of items tested is less than the credibility threshold value then the results of the determination indicate that additional items should be tested without regard to the probability that the failure rate for the population is within the acceptable failure rate; and outputting an indication of whether or not to test additional items in the sample set based on the determination.

7. One or more non-transitory computer readable media storing computer-executable instructions which, when executed on a computer system, perform a method comprising:

identifying an acceptable failure rate for a population comprising a predetermined number of items, wherein each item in the population is capable of being tested to determine whether the item is a passing item or a failing item based on a set of testing parameters;

receiving a required confidence level corresponding to at least one of (a) a desired probability that the failure rate for the population is within the acceptable failure rate, or (b) a desired probability that the failure rate for the population is not within the acceptable failure rate;

identifying a sample set of items in the population, wherein a size of the sample set is based on a desired testing precision;

before the entire sample set of items is tested, receiving test results for a subset of the items in the sample set;

based on the test results for the subset of items, calculating a probability that the failure rate for the population is within the identified acceptable failure rate;

comparing the required confidence level to the calculated probability that the failure rate for the population is within the identified acceptable failure rate;

based on said comparison, determining whether to test additional items in the sample set not included in the subset of items; and after the required confidence level has been exceeded, calculating and outputting data corresponding to a probability that, based on the received test results, a failure rate for the population is within the acceptable failure rate.

8. The non-transitory computer readable media of claim 7, wherein the calculated data is one of:

a probability that the failure rate for the population is within the acceptable failure rate; or a probability that the failure rate for the population is not within the acceptable failure rate.

9. The non-transitory computer readable media of claim 7, the method further comprising:

determining that not every item in the sample set has been tested; and determining that no additional items need to be tested in order to achieve the required confidence level that either the failure rate for the population is within the acceptable failure rate, or that the failure rate for the population is not within the acceptable failure rate.

10. The non-transitory computer readable media of claim 7, the method further comprising receiving a credibility threshold value;

comparing the credibility threshold value to the number of items for which test results have been received;

performing a determination of whether or not to test additional items in the sample set based on the comparison, wherein if the number of items tested is less than the credibility threshold value then the results of the determination indicate that additional items should be tested without regard to the probability that the failure rate for the population is within the acceptable failure rate; and outputting an indication of whether or not to test additional items in the sample set based on the determination.

11. A method, comprising:

identifying, at a population testing computing device, an acceptable failure rate for a population, wherein each item in the population is capable of being tested to determine whether the item is a passing item or a failing item based on a set of testing parameters;

receiving a required confidence level corresponding to at least one of (a) a desired probability that the failure rate for the population is within the identified acceptable failure rate, or (b) a desired probability that the failure rate for the population is not within the identified acceptable failure rate;

identifying a sample set of items in the population, wherein a size of the sample set is based on a desired testing precision;

before the entire sample set of items is tested, receiving test results for a subset of the items in the sample set;

based on the test results for the subset of items, calculating a probability that the failure rate for the population is within the identified acceptable failure rate;

comparing the required confidence level to the calculated probability that the failure rate for the population is within the identified acceptable failure rate;

based on said comparison, determining whether to test additional items in the sample set not included in the subset of items; and after the required confidence level has been exceeded, calculating and outputting data, by the population testing computing device, corresponding to a probability that, based on the received test results, the failure rate for the population is within the identified acceptable failure rate.

12. The method of claim 11, wherein receiving the required confidence level comprises:

receiving a first required confidence level corresponding to a desired probability that the failure rate for the population is within the identified acceptable failure rate; and receiving a second required confidence level different from the first required confidence level, the second required confidence level corresponding to a desired probability that the failure rate for the population is not within the identified acceptable failure rate.

13. A computing device comprising:

a processor controlling at least some operations of the computing device; and a memory storing computer executable instructions that, when executed by the processor, cause the device to perform a method to calculate the sufficiency of a testing of a population, said method comprising:

identifying an acceptable failure rate for a population comprising a predetermined number of items, wherein each item in the population is capable of being tested to determine whether the item is a passing item or a failing item based on a set of testing parameters;

identifying a sample set of items in the population, wherein a size of the sample set is based on a desired testing precision;

receiving test results corresponding to a testing of a subset of the items in the sample set;

calculating a current failure rate for the subset of items in the sample set that have been tested;

calculating a z-score based on the current failure rate of the subset of tested items, the z-score corresponding to a difference in the number of standard deviations of the subset of tested items in comparison to the acceptable failure rate for the population; and calculating and outputting data corresponding to a probability that, based on the received test results, a failure rate for the population is within the acceptable failure rate.

14. The computing device of claim 13, the method further comprising:

if the current failure rate is greater than the acceptable failure rate for the population, comparing the calculated z-score to a first predetermined z-score associated with a required level of confidence regarding the inadequacy of the population;

if the current failure rate is less than the acceptable failure rate for the population, comparing the calculated z-score to a second predetermined z-score associated with a required level of confidence regarding the adequacy of the population;

based on the comparison, performing a determination of whether or not to test additional items in the sample set; and outputting an indication of whether or not to test additional items in the sample set based on the determination.

15. One or more non-transitory computer readable media storing computer-executable instructions which, when executed on a computer system, perform a method comprising:

identifying an acceptable failure rate for a population comprising a predetermined number of items, wherein each item in the population is capable of being tested to determine whether the item is a passing item or a failing item based on a set of testing parameters;

identifying a sample set of items in the population, wherein a size of the sample set is based on a desired testing precision;

receiving test results corresponding to a testing of a subset of the items in the sample set;

calculating a current failure rate for the subset of items in the sample set that have been tested;

calculating a z-score based on the current failure rate of the subset of tested items, the z-score corresponding to a difference in the number of standard deviations of the subset of tested items in comparison to the acceptable failure rate for the population; and calculating and outputting data corresponding to a probability that, based on the received test results, a failure rate for the population is within the acceptable failure rate.

16. The non-transitory computer readable media of claim 15, the method further comprising:

if the current failure rate is greater than the acceptable failure rate for the population, comparing the calculated z-score to a first predetermined z-score associated with a required level of confidence regarding the inadequacy of the population;

if the current failure rate is less than the acceptable failure rate for the population, comparing the calculated z-score to a second predetermined z-score associated with a required level of confidence regarding the adequacy of the population;

based on the comparison, performing a determination of whether or not to test additional items in the sample set; and outputting an indication of whether or not to test additional items in the sample set based on the determination.

* * * * *